Feb. 3, 1959 L. W. BAGBY 2,871,698
PRESSURE INTEGRATING SYSTEM
Filed March 1, 1957 2 Sheets-Sheet 1

INVENTOR:
Leland W. Bagby
By Herbert E. Metcalf
His Patent Attorney

Feb. 3, 1959 L. W. BAGBY 2,871,698
PRESSURE INTEGRATING SYSTEM
Filed March 1, 1957 2 Sheets-Sheet 2
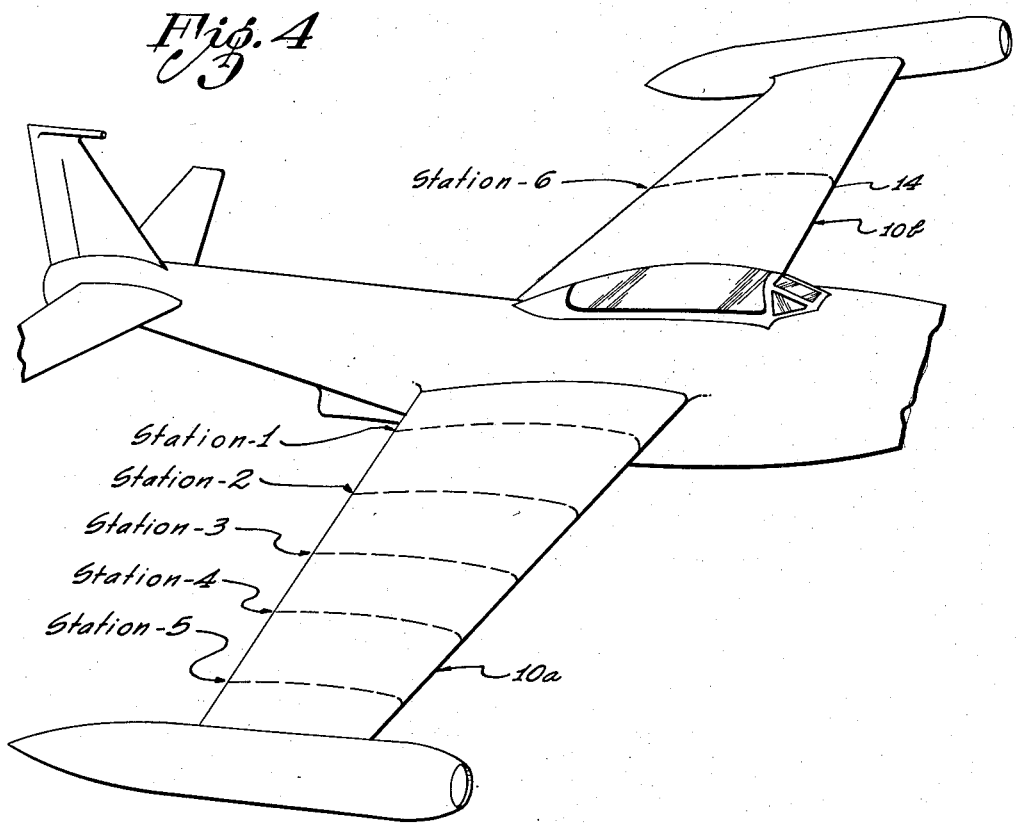
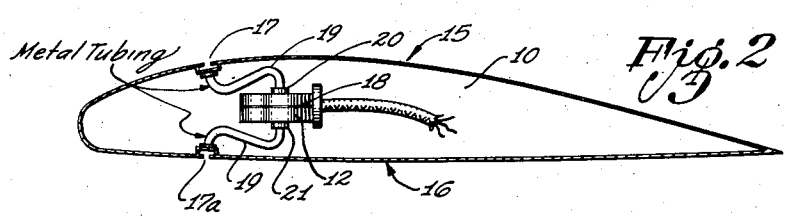
INVENTOR:
Leland W. Bagby
His Patent Attorney

United States Patent Office 2,871,698
Patented Feb. 3, 1959

2,871,698

PRESSURE INTEGRATING SYSTEM

Leland W. Bagby, La Puente, Calif., assignor to Northrop Aircraft, Inc., Hawthorne, Calif., a corporation of California Application March 1, 1957, Serial No. 643,432

15 Claims. (Cl. 73—147)

This invention relates to a means and method of obtaining an instantaneous summation of data from a great plurality of any type of analog signals in a test program or situation where various combinations of integrated information are required, and more particularly, to the measurement of air loads acting on surface areas of an airplane, or the like.

The determination of the air load distribution over the wing and the tail of high performance airplanes in flight has become a problem increasing in its complexity and importance.

Present methods of determining air loads acting on particular surface areas of an airplane are usually obtained from data taken from strain gages, mounted at various points on the structure of the areas to be tested.

The method of obtaining air loads from strain gage data is difficult and time consuming. When air loads acting on an airplane wing, for instance, are to be obtained from strain gage data, the wing must be static loaded to calibrate the strain gage installation before flight test. If a critical strain gage malfunctions, the gage must be replaced and the entire wing recalibrated, which is a very lengthy process.

Moreover, the strain gage method is based upon using a structure that can be readily analyzed, since the air load is determined by the measurement and analysis of strains in the test structure.

Primarily, there are two methods of determining these loads, (a) NACA strain gage method, and (b) the pressure gage method; the latter however not being much used.

Recent airplane designs dictated by advanced aerodynamic requirements have produced highly statically indeterminate structures, and to further complicate this trend, these aircraft are capable of flying well into the region where aerodynamic heating of the structure will occur.

Because of the effect of transient thermal strains induced into a statically indeterminate structure, producing ambiguous load patterns, it has recently been deemed necessary to reconsider pressure methods for the determination of air loads in flight, though the development of such methods had previously given way largely to the more convenient strain gage methods.

A variety of pressure recording systems are in use to obtain air loads information. A common problem in all applications has been the processing of the immense quantities of data normally associated with this method. The approach, to date, has been to record all pressure signals individually and transcribe these data by manual reading followed by semiautomatic or automatic machine computing. The expense and elapsed time required to conduct the test and analyze the data has heretofore been considered an extremely undesirable feature.

The accuracy and reliability of pressure transducers has improved greatly over the last few years and in the pressure integrating system of the present invention, by measuring the air pressures acting on particular station surface areas of an airplane wing, or the like, and electrically integrating the pressure gage data in flight, the total air loads can be accurately determined.

In the present invention the concept of automatic integration of pressure data is unique because it reduces the quantity of data to be processed by the means of integrating these data before transcription onto the recording medium. A double advantage is thus gained over the method of recording individual readings in that the capacity requirement of the recording medium is considerably reduced, eliminating the necessity for commutation or multiple frequency recording, and further, the amount of data to be transcribed and analyzed is minimized to the extent that no expensive computing machines are required.

In broad terms, the present invention comprises a pressure integrating system using a plurality of differential pressure transducers whose electrical outputs are proportional to the difference in air pressure on the upper and lower surface at a particular point on an airfoil, the transducers being mounted at predetermined spaced intervals along an airplane wing station, or the like, whereby total lifts and total moments are integrated electrically at each station area so that measurements taken from a plurality of station areas will give the total wing load, wing bending moment, wing torsion, and center of pressure location.

It is an object of the present invention to provide a pressure integrating system to more accurately measure the forces involved in air loads acting on surface areas of an airplane wing, or the like.

Another object of the invention is to provide a pressure integrating system that requires substantially no pretest calibration loading.

And still another object of the invention is to reduce the quantity of data to be processed by means integrating those data before transcription onto the recording medium.

Other objects of the invention will appear from the disclosure of the following detailed description of a preferred embodiment thereof, having reference to the accompanying drawings which constitute a part of said disclosure.

In the drawings:

Figure 2 is a cross-sectional diagrammatic view of the wing taken as indicated by line 2—2 in Figure 1, showing installation of one of the pressure transducers.

Figure 4 is a perspective view of an airplane showing the location of station areas on an airplane wing at which pressure transducers are preferably mounted.

Figure 1:
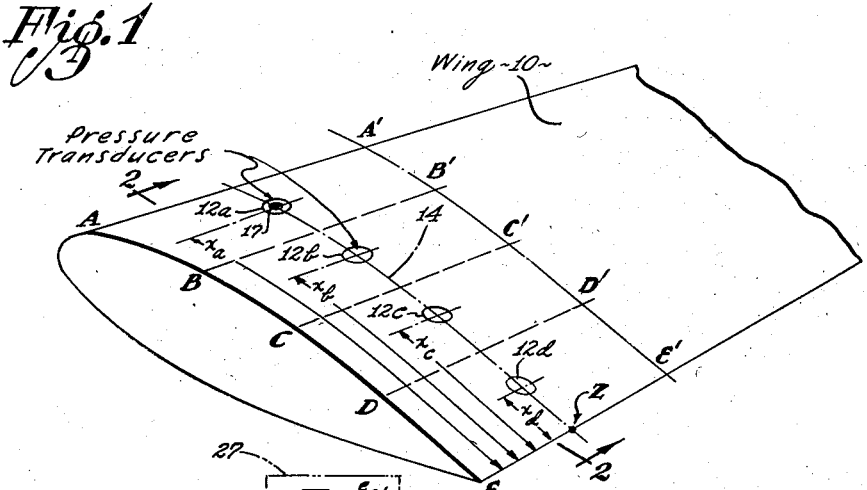
Figure 1 shows a fragmentary perspective view of the wing of an airplane with a plurality of pressure transducers mounted at predetermined spaced intervals on a wing station area.

Referring to Figure 1 the numeral 10 indicates a wing of an airplane having a plurality of pressure transducers indicated by numerals 12a through 12d mounted at predetermined spaces along a given wing station 14. It might be mentioned that "wing stations" designate vertical planes through the wing parallel to the longitudinal center line of the airplane, at specified distances therefrom.

Let it be understood that the arrangement shown in Figure 1 for one wing station 14 is typical of this invention, and that integrated measurements taken from a plurality of wing stations will give the total wing air load. A wing station 14 may have any number of pressure transducers (20, for instance) mounted along it between the leading and trailing edges.

Referring now to Figure 2, each pressure transducer 12 of the type illustrated herein is a differential type instrument having two active inductive elements and a central diaphragm 18 of magnetic material which is deflected in response to air pressure. Various commercial models of this type of pressure transducer are available, such as the North American Instruments, Inc., Model DP-7, for example. The transducers 12 are mounted as shown, with one side of the diaphragm 18 exposed to pressure at a point on the upper wing surface 15, and the other side of the diaphragm exposed to pressure at a point on the lower wing surface 16 directly below the upper point. To accomplish this, a small hole 17 is provided in the wing surface at the desired point, and tubing 19 is connected from the inner side of the hole to one port 20 of the transducer 12, which is screw-mounted to a bracket (not shown). The opposite port 21 of the transducer 12 is similarly connected to a flush opening 17a in the opposite wing surface 16.

Other transducer types could alternatively be employed, or two transducers of a similar type; one of the two located just at or below the upper wing surface 15, and the other near the lower wing surface 16, the two being electrically connected to subtract.

The electrical output from the transducer (which will be described later) is proportional to the difference in the pressures at these two opposite positions (openings), thus giving a differential signal which is representative of the total net force on the portion of wing at the particular wing station and percentage chord line where the transducer measurement is taken. Transducer 12a, for instance, is "assigned" to the predetermined area ABB'A' in Figure 1, and the output from transducer 12b is assumed to cover or be representative of area BCC'B', etc. With the transducers spaced to take their measured pressures at predetermined points along the wing station 14, the air load on the whole airfoil section of the wing at that station can be obtained. This will become more apparent as the present description is continued.

Figure 3:
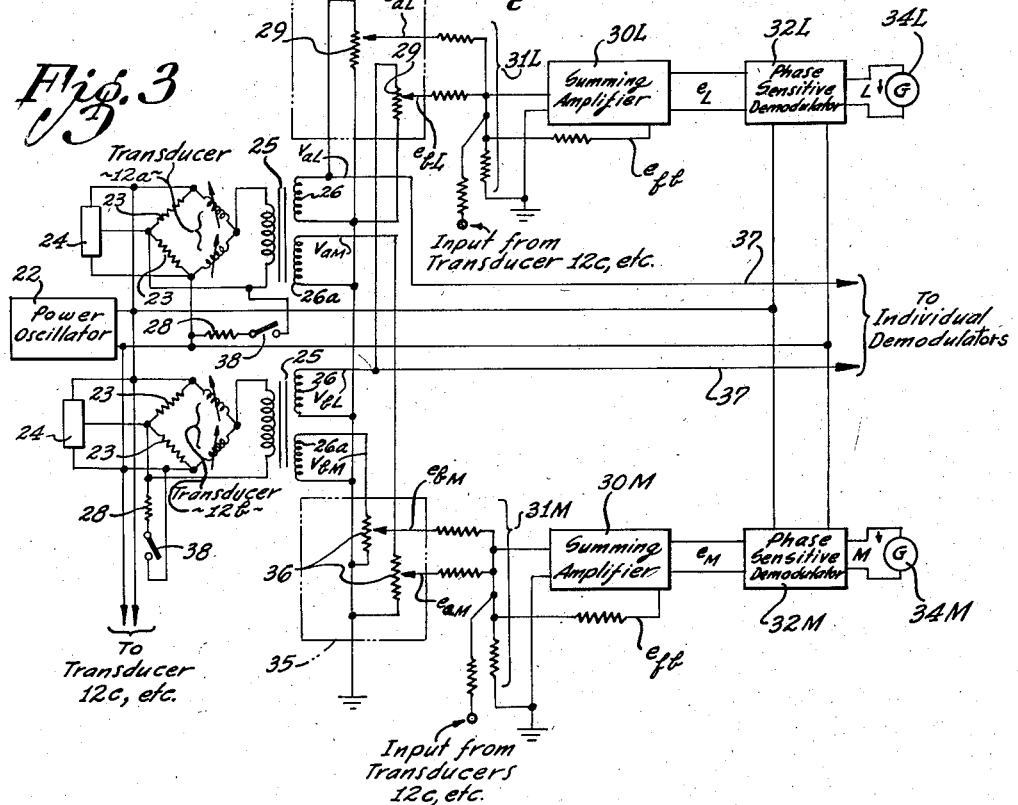
Figure 3 shows a combined block and schematic diagram of the apparatus used in the preferred form of the invention.

Figure 3 is a schematic diagram showing two of a plurality of pressure transducers 12a, 12b at one wing station, for example, and the circuits associated therewith. Each transducer is connected with two resistors 23 to form a bridge circuit, with input power supplied from a 3 kc. power oscillator 22 to input terminals of the bridge. A bridge balancing circuit 24 is provided so that each bridge can be accurately balanced to null. The analog electrical signal from each transducer 12a, 12b is coupled into an output transformer 25 having two identical secondary windings 26, 26a, one for lift and one for moment. The transducer output voltages $V_{aL}$, $V_{bL}$, etc. from secondaries 26 enter a first weighing network 27 which attenuates each output such that the output voltages $e_{aL}$, $e_{bL}$ are proportional to the lift force on the wing area represented by each transducer 12a, 12b. Potentiometers 29 in the weighing network illustrate attenuation or voltage divider devices which are adjusted as desired to give a signal value representing lift force on the area covered by each transducer. In setting these potentiometers, the area represented by the transducer and the transducer sensitivity are accounted for. The output voltages of the lift weighing network 27 are applied to a mixing circuit 31L and then enter a summing amplifier 30L where the output $e_L$ is the sum of all voltage inputs from the weighing network 27.

The summing amplifier 30L, for example, is a stable, high-gain amplifier with negative feed-back, which produces an output voltage always equal to a constant number times its input voltage as represented by the summation voltage present at the output of the mixing circuit 31L. Such type of amplifier is conventional and can be found in various prior art literature, such as the text entitled Electron-Tube Circuits, by Seely (1950), on page 148 thereof. The output circuit or stage of the summing amplifier will be designed in accordance with general practice to properly match the following circuitry.

The output voltage of the lift summing amplifier 30L enters a phase sensitive demodulator 32L whose output current (variable D. C.) is proportional in magnitude and polarity to the magnitude and phase of voltage input, to thus provide the desired information from the transducers. This demodulator 32L, for example, can be a conventional ring demodulator wherein the connections into the present system, as shown in Figure 3, are obvious. The output L of the phase sensitive demodulator 32L is then connected to a recording means 34L which records the total lift measured by the transducers 12 along wing station 14. It will be seen that this demodulated output L thus gives the total lift acting on the wing area AEE'A' shown in Figure 1.

Referring again to Figure 3, the transducer output voltages $V_{aM}$, $V_{bM}$, etc. from secondaries 26a enter a second weighing network 35 which attenuates each output such that the output voltages $e_{aM}$, $e_{bM}$ are proportional to the moment about an arbitrary chordwise point on the chord line. For simplicity, potentiometers 36 in the weighing network 35 may be adjusted so their output represents the moment of force at each transducer location, respectively, about a trailing edge point Z in Figure 1, for example. In setting these potentiometers, area represented by the transducers, transducer sensitivity, and moment arm are accounted for. The output voltages of the moment weighing network 35 go through a mixing network 31M and then enter a summing amplifier 30M where the output $e_M$ is the sum of all voltage inputs from the second weighing network 35.

The output voltage of the moment summing amplifier 30M enters a phase sensitive demodulator 32M similar to demodulator 32L. The output M of the phase sensitive demodulator 32M is then connected to a recording means 34M, which records the total moment at wing station 14 about point Z, for example. It will be seen that this demodulated output M thus gives the moment of the forces on wing area AEE'A' about the trailing edge.

The output voltage $e_L$ (or $e_M$) equals the sum of all the mixer input voltages times a constant K. Since K can be made essentially independent of line voltage fluctuations and changing tube characteristics, a very accurate summation of an infinite number of voltages can be obtained.

The total moment M divided by the total force L at station 14 gives the moment arm distance from the point Z at which a point load of magnitude L could be applied to obtain the same result. By combining the total lifts and total moments of each wing station where a plurality of transducers are installed, wing loading, wing bending moment, wing torsion, shear loads, and center of pressure can be obtained.

In use, referring to Figure 4, for an airplane with pressure instrumentation installed at five (5) test stations on one wing panel 10a and one (1) test station on the other wing panel 10b, only twelve trace recordings are required to obtain air loads information, one at each station for lift and one at each station for moment. The data analysis is extremely simple, requiring no complicated and expensive data processing equipment. The bending moment and shear loads are determined simply by reading the lift summation trace for each instrumented wing station and plotting those data versus the semi-span to obtain the load distribution. The spanwise variation of the center of pressure is determined by dividing each chord moment summation by its corresponding lift summation. Instead of using the trailing edge of the wing for the moment axis, some other reference line may be used, such as the 50% chord line, for example, if desired. In this event, the leads from the moment secondaries 26a will be reversed from all transducers mounted on one side of this 50% line, so that the opposite polarity signals will thus effect a subtractive moment as required.

For purposes of checking, electrical leads 37 from at least one of the secondary windings 26 and 26a of each output transformer 25 are each connectable to a separate demodulator (not shown) for individual checking of each transducer 12, and to obtain a graph showing the "pressure profile" along or at one wing station.

Accurate test pressures can be supplied to the respective wing openings 17 by external apparatus, such as a pump, hoses, valves, and gages, to enable exact adjustment and/or determination of each transducer bridge output. To calibrate the output of each transducer bridge, and to see that each summation circuit is operating properly, a calibrating resistor 28 and a series switch 38 are connected across one of the resistive legs of each transducer bridge. The calibrating resistors 28 can and preferably do vary with the various transducer locations on the aircraft, depending upon the amount of simulated pressure at which calibration is desired. For example, it may be desirable to calibrate one transducer at 0.2 p. s. i. and another at 7.5 p. s. i., if they are normally experiencing a comparable value in actual operation of the system. All switches 38 are usually ganged together as multiple relay contacts operable during flight.

This calibrating arrangement also enables a very simple transducer replacement procedure in the event of a transducer failure, insuring a reliable and accurate system. Therefore, it is readily seen that the entire wing need not be statically loaded to re-calibrate the whole system, as is necessary with strain gages.

To explain further important new results of my invention in operation, it can be seen that once a summation of the lift is obtained for each wing station on a completely instrumented wing panel, the total wing bending moment about an arbitrary chord station (wing root, for example) can be easily obtained by feeding the respective $e_L$ voltages from the outputs of the summing amplifiers, such as 30L, into separate additional weighing networks adjusted to give a moment-representative output depending upon the span-wise distance of each $e_L$ force from the arbitrary chord station, and then feeding these weighing network outputs into a single additional summing amplifier, the output of which is the required total bending moment. In other words, a plurality of transducers extending span-wise of the wing can obviously be combined in a circuit similar to a chord-wise plurality of transducers, or a plurality of summing amplifier outputs integrated in the same manner as shown herein for a plurality of individual transducers.

The present invention is also useful in ascertaining the total instantaneous loads occurring on an airplane during maneuvers. Thus, further flight test action is immediately governed right at the time of test.

From the foregoing description it can be seen that this system presents continuously integrated pressure data from each wing station as (1) a summation of chord-wise lift force and (2) a summation of the chord moments. This data is then recorded on a proven oscillograph system, thereby eliminating the high cost of development for a new recording device.

Moreover, while the specific purpose of the embodiment of the present invention described herein is to obtain air loads on an airplane being flight tested, it will be obvious that the invention is not limited to this field only, but that the principles taught herein are equally useful in obtaining similar data for other investigations or analyses in a continuous manner, with ordinary modifications in the instruments used and in the physical quantities desired for a particular problem. For instance, the same method and basic combination of elements can be set up to analyze a bridge truss under constant or transient loads, or to determine detailed forces and stresses imposed on a dam.

Therefore, while in order to comply with the statute, the invention has been described in language more or less specific as to structural features, it is to be understood that the invention is not limited to the specific features shown, but that the means and construction therein disclosed comprise a preferred form of putting the invention into effect, and the invention is therefore claimed in any of its forms or modifications within the legitimate and valid scope of the appended claims.

What is claimed is:

1. A pressure integrating system for determining the pressure acting on a particular surface area of an airplane wing, comprising: a plurality of pressure transducers; means providing a first output from each transducer to be used for obtaining lift information; means providing a second, identical, output from each transducer to be used for obtaining moment information; said transducers mounted at predetermined spaced intervals on said surface area; a first summing amplifier; means connecting said first summing amplifier to all of said first outputs of said transducers and integrating the total lifts; a weighing network connected to all of said second outputs of said transducers and respectively attenuating said outputs so that each is proportional to moment of force represented by its respective transducer about a common predetermined point in said area; a second summing amplifier connected to the output of said weighing network and integrating the total moments; and indicating means connected to the output of each said first and second summing amplifiers.

2. Apparatus in accordance with claim 1 wherein the means to indicate the output of each said first and second summing amplifiers is a recording means.

3. Apparatus in accordance with claim 1 wherein each of said transducers is a differential type comprising two active elements, means exposing one side of each said transducer to pressure on the upper surface of said wing, and means exposing the other side to pressure on the lower surface of said wing directly opposite the first exposure position, whereby each of the two outputs from said transducers provides the net differential pressure acting on said wing at the areas where the transducer measurements are taken.

4. In an airplane wing, the combination of a relatively narrow surface area along a wing station; a plurality of pressure transducers; means providing a first output from each transducer for obtaining lift; means providing a second, identical, output from each transducer for obtaining moment; said transducers mounted at predetermined spaced intervals chordwise along said wing station surface area; means for impressing a constant-frequency input voltage across said transducers; a first weighing network connected to all of said first outputs and respectively attenuating said outputs so that each is proportional to lift at the area portion represented by its associated transducer; a first summing amplifier connected to the output of said first weighing network and integrating the total lifts at said wing station area; a first demodulator connected to the output of said first summing amplifier; a second weighing network connected to all of said second outputs and respectively attenuating said outputs so that each is proportional to moment of lift at the area portion represented by its associated transducer about a common predetermined point on said wing station; a second summing amplifier connected to the output of said second weighing network and integrating the total moments at said wing station area; a second demodulator connected to the output of said second summing amplifier; and means to indicate the output of each said first and second demodulators, whereby the total lift and moment of lift at said wing station are obtained.

5. A pressure integrating system for determining the pressure acting on particular surface areas of an airplane wing, comprising: a plurality of pressure-responsive transducers, each transducer being connected in an electrical bridge circuit and urged by air pressure to unbalance the bridge; a bridge output transformed having two identical output windings, a first said output winding used for obtaining lift, and a second said output winding used for obtaining moment; said transducers mounted at predetermined spaced intervals on said surface areas; means for impressing a constant-frequency power input voltage across the inputs of said bridges; a first weighing network connected to all of said first outputs and respectively attenuating said outputs so that each is proportional to lift at the area represented by its associated transducer; a first summing amplifier connected to the output of said first weighing network, and integrating the total lifts; a first demodulator connected to the output of said first summing amplifier; a second weighing network connected to all of said second outputs and respectively attenuating said outputs so that each is proportional to moment of lift at the area portion represented by its associated transducer about a common predetermined point; a second summing amplifier connected to the output of said second weighing network and integrating the total moments; a second demodulator connected to the output of said second summing amplifier; and means to indicate the output of each said first and second demodulators.

6. Apparatus in accordance with claim 5 wherein each of said transducers is a differential type comprising two active elements connected as two adjacent legs across the input of its said bridge circuit, and including means exposing one side of each said transducer to air pressure at a small defined area on the upper surface of said wing, and means exposing the other side to air pressure at an opposite small defined area on the lower surface of said wing, whereby the bridge output from said transducers provides the net upward pressure acting on said wing at the recited position.

7. A pressure integrating system for determining the pressure acting on particular surface areas of an airplane wing, comprising: a plurality of pressure-responsive transducers, each transducer being connected in an electrical bridge circuit and urged by air pressure to unbalance the bridge; a bridge output transformer having two identical output windings, a first said output winding for obtaining lift, and a second said output winding for obtaining moment; said transducers mounted at predetermined spaced intervals on said surface areas; a first summing amplifier; means connecting said first summing amplifier to all of said first outputs of said transducers and integrating the total lifts; a weighing network connected to all of said second outputs of said transducers and respectively attenuating said outputs so that each is proportional to moment of force represented by its respective transducer about a common predetermined point in said wing on a line with said transducers; a second summing amplifier connected to the output of said weighing network and integrating the total moments; and means to indicate the output of each said first and second summing amplifiers.

8. A pressure integrating system for determining the forces acting on particular surface areas of an airplane wing, comprising: a plurality of pressure transducers; means providing a first output from each transducer for obtaining lift; means providing a second, identical, output from each transducer for obtaining moment; said transducers mounted at predetermined spaced intervals on said surface areas; a first summing amplifier; means connecting said first summing amplifier to all of said first outputs and integrating the total lifts; a weighing network connected to all of said second outputs to respectively attenuate said outputs so that each is proportional to moment of force represented by its respective transducer about a common predetermined point; said weighing network comprising a plurality of voltage divider means connected respectively across each of said transducer second outputs, each output of said voltage divider means being set to give a fractional output ratio in proportion to the distance of its associated transducer from said common point; a second summing amplifier connected to the output of said weighing network and integrating the total moments; and means to indicate the output of each said first and second summing amplifiers.

9. A pressure integrating system for determining the forces acting on particular surface areas of an airplane wing, comprising: a plurality of pressure transducers; means providing a first output from each transducer for obtaining lift; means providing a second, identical, output from each transducer for obtaining moment; said transducers mounted at predetermined spaced intervals on said surface areas; means for impressing a constant-frequency voltage across said transducers; a first summing amplifier; means connecting said first summing amplifier to all of said first outputs and integrating the total lifts; a first demodulator connected to the output of said first summing amplifier; a weighing network connected to all of said second outputs and respectively attenuating said second outputs so that each is proportional to moment of force represented by its respective transducer about a common predetermined point; a second summing amplifier connected to the output of said weighing network and integrating the total moments; a second demodulator connected to the output of said second summing amplifier; and means to indicate the output of each said first and second demodulators.

10. Apparatus in accordance with claim 9 wherein the means to indicate the output of each said first and second demodulators is a recording means.

11. A pressure integrating system for determining various loads on an airplane wing in flight, comprising: a plurality of pressure transducers mounted at predetermined spaced intervals on said wing; a separate electrical bridge circuit incorporating each said transducer as the output producing means thereof variable in accordance with air pressure; a bridge output transformer having two identical output windings, a first said output winding for obtaining lift, and the second said output winding for obtaining moment; means for impressing a constant-frequency power input voltage across the inputs of said bridges; a first weighing network having a plurality of predetermined value voltage divider components connected respectively across said first output windings, the outputs of said voltage dividers being proportional to the lift represented by the pressure-responsive output of each respective transducer; a first summing amplifier connected to all the voltage divider outputs from said first weighing network and having an output equal to the sum of the total inputs; a first phase sensitive demodulator connected to the output of said first summing amplifier and to said input voltage means; a second weighing network having a plurality of predetermined value voltage divider components connected respectively across said second output windings, the outputs of said voltage dividers attenuating the transducer outputs and being proportional to the moment of lift represented by the output of each respective transducer about a common predetermined point in said wing; a second summing amplifier connected to the outputs of said second weighing network; a second phase sensitive demodulator connected to the output of said second summing amplifier and to said input voltage means; and means to indicate the voltage output of each said first and second demodulators.

12. Apparatus in accordance with claim 11 wherein each of said transducers is a differential type comprising two active elements, means exposing one side of each said transducer to pressure at a small portion of the upper surface area of said wing, and means exposing the other side to pressure at a small portion of the lower surface area of said wing directly opposite the first exposure portion, whereby each of the two outputs from said transducers provides the net differential pressure acting on said wing at the portion where the transducer measurements are taken.

13. Apparatus in accordance with claim 11 wherein the means to indicate the voltage output of each said first and second demodulators is a recording means.

14. A pressure integrating system for determining various loads on an airplane wing in flight, comprising: a plurality of pressure transducers mounted at predetermined spaced intervals on said wing; a separate electrical bridge circuit incorporating each said transducer as the output producing means thereof variable in accordance with air pressure; a bridge output transformer having two identical output windings, a first said output winding for lift, and the second said output winding for moment; a first summing amplifier; means connecting said first summing amplifier to all of said first output windings, and having an output equal to the sum of the total input thereto; a weighing network having a plurality of predetermined value potentiometer components connected respectively across said second output windings, the outputs of said potentiometers attenuating the transducer outputs and being proportional to the moment of lift represented by the output of each respective transducer about a common predetermined point in said wing; a second summing amplifier connected to all the outputs from said potentiometers of said weighing network; and means to indicate the voltage output of each said first and second summing amplifiers.

15. In an airplane having a wing, a pressure integrating system comprising: a plurality of differential pressure transducers each having two ports and a central diaphragm therebetween, and installed within said wing; means defining a first plurality of openings in the upper surface of said wing in the fore-and-aft direction at predetermined intervals along a particular wing station; means defining a second plurality of openings in the lower surface of said wing and respectively directly opposite said first plurality at the same wing station; means connecting one port of each said transducer to a respective upper opening and thus exposing one side of said diaphragm to the air pressure thereat; similar means connecting the other port to the opposite respective lower opening; dual output means from each transducer, each providing the net differential pressure acting on said wing at the location of said opposite openings; the spacings of said openings and the sensitivity of said transducers so related that the pressure output information represents the net lift force on the wing area effectively assigned to each transducer; a first summing amplifier; means connecting said first summing amplifier to all of the first of said dual outputs and integrating the total lift on said wing station for the area effectively assigned to said transducers; a weighing network connected to all of the second of said dual outputs and respectively attenuating said second outputs so that each is proportional to moment of lift at the area portion represented by its associated transducer about a common predetermined point on said wing station; a second summing amplifier connected to all of the outputs from said weighing network and integrating the total moments at said wing station about said point; and means to indicate the output of each said first and second summing amplifiers; whereby such measurements taken from a plurality of similar other wing station systems gives data for determining total wing lift, wing bending moment, wing torsion, shear loads, and center of pressure.

References Cited in the file of this patent

UNITED STATES PATENTS

| | | |
|---|---|---|
| 2,390,534 | Heuver | Dec. 11, 1945 |
| 2,443,098 | Dean | June 8, 1948 |
| 2,540,807 | Berry | Feb. 6, 1951 |
| 2,551,526 | Campbell | May 1, 1951 |
| 2,602,329 | Clark | July 8, 1952 |
| 2,814,198 | Howland | Nov. 26, 1957 |